June 10, 1969  C. W. MODERSOHN  3,449,207
DUAL ORIFICE VACUUM FORMING MOLD
Filed Sept. 3, 1965  Sheet 2 of 2

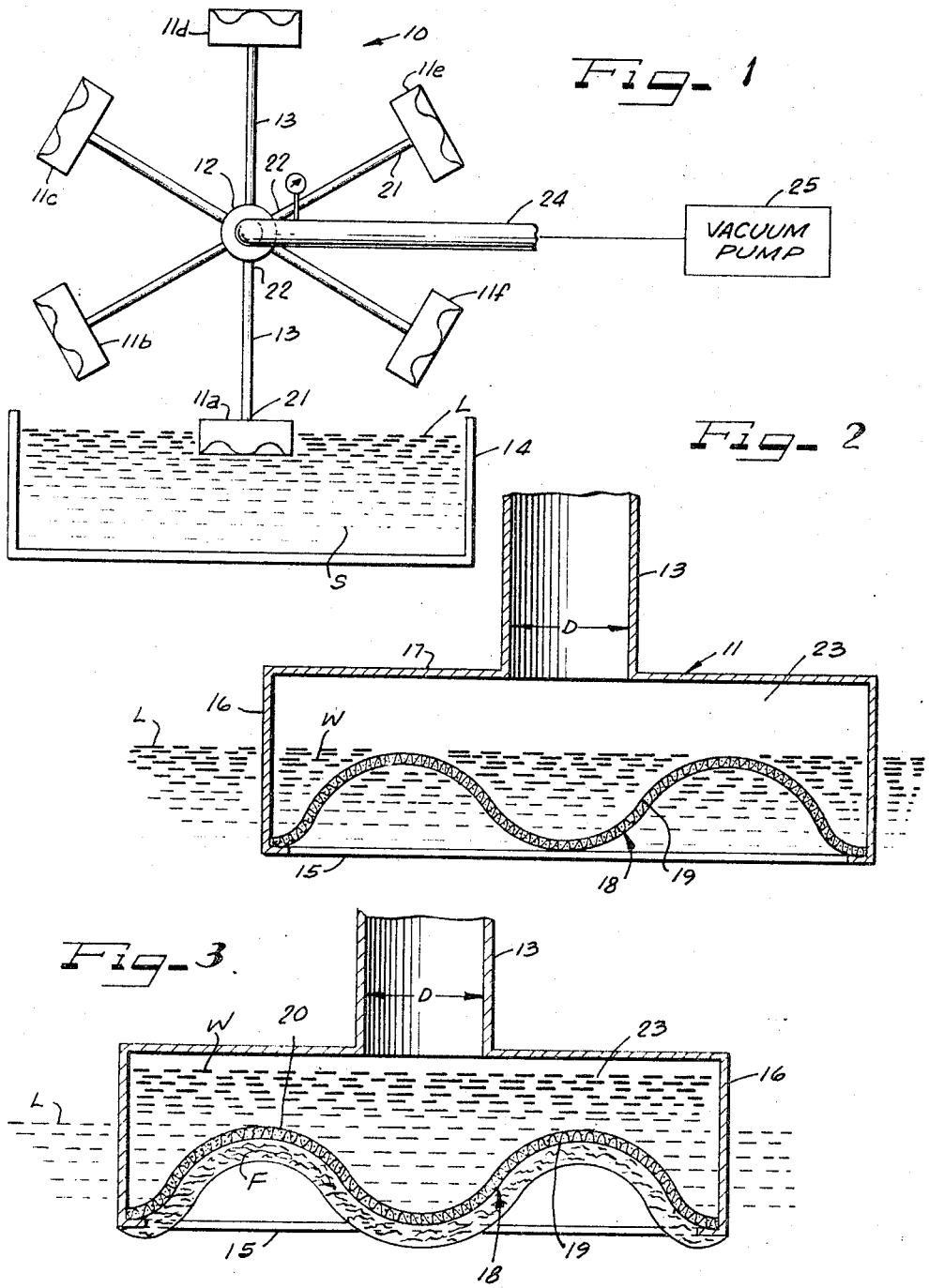

INVENTOR.
CHARLES W. MODERSOHN
BY Hill, Sherman, Meroni, Gross & Simpson
ATTORNEYS

United States Patent Office 3,449,207
Patented June 10, 1969

3,449,207
DUAL ORIFICE VACUUM FORMING MOLD
Charles W. Modersohn, Beloit, Wis., assignor to Beloit Corporation, Beloit, Wis., a corporation of Wisconsin
Filed Sept. 3, 1965, Ser. No. 484,919
Int. Cl. D21j 7/00
U.S. Cl. 162—411    6 Claims

ABSTRACT OF THE DISCLOSURE

A pulp molding machine having a plurality of molds successively submerged in a pan of stock. A vacuum pump is connected by means of conduits to vacuum chambers formed in the molds and a first orifice is formed between the vacuum pump and each of the vacuum chambers to maintain a vacuum condition in the conduits and a second orifice providing a bleed opening is formed in the wall of each of the molds to communicate the vacuum chambers with atmospheric air surrounding the molds. The orifices control the level of vacuum within the vacuum chambers.

---

This invention relates generally to molding machines and more particularly to a vacuum molding machine for molding articles from a liquid suspension of fibers such as pulp slurry or stock.

In vacuum molding machines a mold member is provided with a pervious or porous die plate conforming to the configuration of the molded article and a chamber is formed in the mold member behind the die plate for connection to a vacuum pump or the like for pulling a vacuum on the back side of the die plate. The die plate is dipped in stock, and as a result of the vacuum, water in the stock is drawn through the die plate into the chamber of the mold and fibers in the stock collect and build up on the outer surface of the die plate to form the molded article.

Some machines include a plurality of mold members which are moved serially through successive operating stations such as a forming station where the mold members are dipped into the stock, a press station where the fibers are pressed on the die plate, a drying station where the molded article is completely or partially dried and an extraction station where the molded articles are removed from the mold members. The empty mold members are then again dipped into the stock to repeat the cycle.

Such machines require that a large volume of air flow through the molded article and pervious mold during passage through the sequential stations mentioned above, except for the forming station. In that instance, once the impervious planar surface which surrounds the mold is immersed in the fluid, and the chamber sealed thereby to further entry of air, the interior pressure drops to that of the vacuum system to which all chambers are connected. This change in pressure occurs very rapidly. A typical chamber may contain only three cubic feet of air at atmospheric pressure. This small volume of air is reduced in density to that of the vacuum source in a small fraction of a second. As a result, the in-rush of fluid to the interior of the mold occurs at high velocity and with a great deal of turbulence. Thus, the velocity with which the fluid-supported fibers impinge upon the interior of the mold is high. The turbulence of entry results in a non-uniformity of deposition of fibers in various portions of the mold. The high velocity results in an increase in the tendency toward intertwining or "stapling" of the longer fibers on the wires of the screen which constitutes the lining or forming surface of the porous mold. This latter effect is defined as the condition of a long fiber being equally disposed or draped around a wire such as to resist being dislodged by subsequent hydraulic flow in the direction in which deposition first occurred. The effect is cumulative, since fibers have a cohesive tendency, the result being a clogging of the screen, reduction of permeability in such areas and non-uniformity or absence of formation, resulting in unsatisfactory product. It is therefore desirable to control the rate of pressure change in the chamber interior such as to reduce the initial fluid velocity, thus minimzing or avoiding the two undesirable effects mentioned above.

Another undesirable characteristic in a molded product is a surface texture on the portion adjacent to the screen lining of the mold known as "wire mark." In some instances, subsequent operations are required to reduce or remove such screen imprint, improving appearance, and in some instances to make the surface more appropriate for printing. The degree of wire mark can be considerably reduced if the terminal pressure in the molding chamber is held to a level nearer to atmospheric than that maintained in the remainder of the system. In other words, if the molding is accomplished at low vacuum, as contrasted to the high vacuum required by other functions of the machine. It is, therefore, advantageous to control the vacuum.

A second occasion of turbulence occurs when the mold is retracted from the fluid. At the moment when the impervious plate which borders the mold leaves the fluid surface, an opening is provided for the in-rush of air. This air is imposed upon the liquid contained in the interior of the mold, all of which does not instantaneously fall back to the surface of the stock vat. If the velocity of this entering air is high, as is the case when the rate of exhaustion from the chamber is not controlled, and when the pressure of the remaining air in the mold chamber is greatly lower than atmospheric, the remaining liquid is violently disturbed. This instance of turbulence tends to wash against random surfaces of the interior of the molded article, returning portions of fiber to the stock tank and leaving areas of unevenness in the interior of the molded article.

It has been determined that in stations subsequent to that at which the formation takes place, where ambient or in some instances heated air is to be drawn through the deposited fiber mat in order to remove entrained water, a certain optimum rate of air flow or velocity exists, depending upon the amount of water entrained at any one time and upon the permeability or pervious nature of the formed mat. Air velocity above the appropriate value results in little improvement in the rate of water removal, despite the greater requirement for cubic feet of air per minute to sustain such velocity. Lack of control of this air flow, then, can be very wasteful of the vacuum pump capacity and, therefore, of operating power.

In subsequent stages of drying, when the water which is subject to removal by the mechanical forces of air velocity has been substantially removed, it becomes important to pass as great a volume of air through the vat as can be supplied by the source, so that water will be evaporated into and carried away with such air. Thus any economics in distribution of air which have been effected in previous stations will result at this point in making a greater quantity available for this evaporative purpose, vacuum pump capacity being fixed.

It is generally desirable to connect the vacuum headers or manifolds of a molding machine to a single vacuum source which must operate at a level at least equal to that desired in whatever point in the system is required to be at the highest vacuum.

As can be seen from the foregoing, several vacuum levels and rates of air flow are needed from this single source. Significant advantage is to be gained by individual control of each of these requirements as they occur.

According to the principles of the present invention, the requirement for air flow at any station is controlled by interposition of means between the molding chamber and the vacuum header to increase the pressure drop or resistance to air flow there between and, therefore, the flow rate.

Further means are provided to enable the pressure in the chambers to be maintained at a vacuum level that is lower than that of the header under circumstances where little or no ambient air is entering the chamber through the molds.

It is, therefore, an object of the present invention to provide a vacuum molding machine having plural mold members wherein the c.f.m. requirements of the vacuum producing means are appreciably reduced.

Another object of the invention is to provide means for increasing the production capacity of a vacuum molding machine without impairment of the quality of the molded articles.

Still another object of the invention is to provide means enabling the vacuum condition in the vacuum header to be maintained at a level higher than the optimum vacuum condition in the vacuum chambers of the mold members without producing pin holes and other deformations and defects in the molded articles upon emergence of the mold members from the stock.

Yet another object of the invention is to provide pressure drop means between the vacuum chambers of the individual mold members and the common vacuum header in order to increase the resistance to air flow therebetween prior to submergence of the die plates into the stock, or after the molded articles have been removed from the die plates.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

In the drawings:

FIGURE 1 is a schematic elevational front view of a rotary vacuum pulp molding machine having plural mold members and constructed in accordance with the principles of the present invention;

FIGURE 2 is a vertical sectional view of a conventional vacuum mold member and the level of water therein just after the mold member has been submerged in a pan of stock;

FIGURE 3 is similar to FIGURE 2 but shows the condition of the mold member after fibers in the stock have been deposited on the die plate to form a molded article;

As shown in the drawings:

Figure 4:
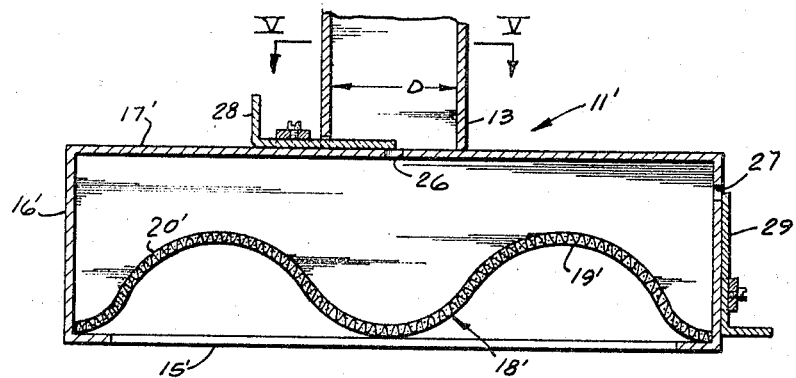
FIGURE 4 is a vertical sectional view of an improved mold member constructed in accordance with the principles of the invention.

Although the principles of the present invention are of utility in any vacuum molding machine a particularly useful application is made to a vacuum molding machine of the rotary type, an illustrative embodiment of which is indicated in FIGURE 1 at reference character 10.

The molding machine 10 comprises a plurality of molds 11a–11f mounted on a rotatable drum or axle 12 in circumferentially spaced relation and connected to the drum by means of a corresponding plurality of radially extending support members or spokes 13. Situated below the drum 12 is a pan 14 which is open at the top and which contains a liquid suspension of fibers such as pulp slurry or stock indicated at S. Suitable stock supply and recirculation means are connected to the stock pan 14 in order to maintain a uniform mixture of the stock and to maintain the stock at a predetermined level L within the pan.

A typical mold of a conventional vacuum pulp molding machine is indicated at 11 in FIGURES 2 and 3 and is characterized as comprising a longitudinal side wall 16 which extends around the mold to form an elongated hollow body. A top wall 17 covers a closed inner end of the mold body and an open outer end 15 receives a pervious die plate 18, upon an outer surface 19 of which the pulp fibers are deposited and the shape of which conforms to the configuration of the article to be molded.

In vacuum pulp molding a vacuum condition is produced on a back side for inner surface 20 of the die plate 18 such that when the die plate is dipped or submerged into the stock water the stock is drawn through the pervious die plate and the fibers of the stock are thereby deposited and built up on the outer surface 19 of the die plate as indicated at F in FIGURE 3.

In order to provide this vacuum condition the spokes or support members 13 are formed of rigid tubular construction to serve as conduits, and at their outer or distal ends 21 are connected in fixed assembly to the wall 17 of their respective molds 11 and at their radially inner ends 22 are fixedly connected to the drum 12. The outer end 21 of each of the support members 13 is in fluid communication with a chamber 23 formed in its respective mold 11 between the inner surface 20 of the die plate and the wall 17. The entire inner diameter of the spoke 13, which is indicated in FIGURES 2 and 3 at reference character D, opens directly to the chamber 23, and the inner end 22 of each of the support members 13 is connected in fluid communication by suitable rotary coupling means to one end of a vacuum pipe or conduit 24, which in turn is connected at its opposite end to suitable vacuum producing apparatus such as a vacuum pump indicated diagrammatically at 25.

The operation of the vacuum pump 25 is regulated by suitable control apparatus to maintain a constant vacuum at the point at which the conduit 24 connects to the drum 12, and the vacuum which is maintained at this point must be at least as high as the vacuum level desired in the chambers 23 of the molds 11 as the die plates of the molds are submerged in the stock.

Suitable drive means are also provided for rotating the drum 12 in a clockwise direction, for example, as indicated by the arrow in FIGURE 1. As the drum is turned the molds 11a–11f are dipped successively into the stock S in the pan 14 as they approach their lowermost point in conduit 24 remains constant.

The chambers 23 of all of the molds 11a–11f are continuously in fluid communication with the header or conduit 24. The pressures in the various chambers 23 may vary at any given time, however, even though the pressure in conduit 24 remains constant.

For example, as shown in FIGURE 1, the die plate 18 of mold 11f has not as yet been submerged in the stock S. Therefore the only restriction to air flow through the die plate is that which is imposed by the die plate itself. Assume the pressure in the conduit 24 is maintained at 15″ Hg vacuum. The pressure drop across the die plate 18 of mold 11f might be such as to produce a vacuum of only 5″ Hg in the chamber 23 of the mold 11f.

The die plate of mold 11a, however, is at its lowermost point and is therefore completely submerged in the stock. This, of course, results in a smaller open area of through the die plate and the pressure within chamber 23 of mold 11a will approach or equal the pressure in conduit 24 or 15″ Hg vacuum.

It will be appreciated that as the die plate 18 of mold 11a made initial engagement with the stock S as it approached its lowermost point in the path of travel only the leading portion of the die plate was submerged in the stock. This, of course, results in a smaller open area of the die plate, and therefore an increase in pressure drop through the die plate and a reduction in pressure in the chamber 23 of the mold. Continued travel of the mold 11a toward its lowermost position has the effect of submerging more and more of the die plate thereof in the stock, thereby gradually increasing the pressure drop across the die plate and reducing the pressure in the chamber 23 until eventually the entire die plate is submerged and the pressure in chamber 23 equals the pressure in conduit 24.

After a die plate 18 emerges from the stock, and a quantity of fibers have been deposited thereon as a result of the vacuum in chamber 23, the molded article may pass through one or more stations situated in the path of travel of the molds 11a–11f. For example, a press station may be situated on the ascending side of the path of travel for the purpose of compacting the article formed on the die plate.

In addition a drying station may be employed to partially or completely dry the molded article on the die plate and an ejection station may be utilized for removing the molded article from the respective die plates before the die plates are again submerged in the stock. The pressures in the chambers 23 of the molds may vary from station to station, depending upon the combined pressure drop of the die plate and the molded article thereon, if the molded article is still on the die plate. The pressure drop across the article itself may vary depending upon its compactness, moisture content etc.

FIGURE 2 is illustrative of a typical mold immediately after the die plate 18 thereof has been completely submerged in the stock S to produce a vacuum in the chamber 23 thereof substantially equal to the high vacuum condition which exists in the conduit 24. A quantity of water W from the stock S has already been drawn through the pervious die plate 18.

FIGURE 3 show the condition of the mold shortly thereafter when the level of the water W has risen in chamber 23 and a quantity of fibers F have been deposited and built up on the outer surface 19 of the die plate 18.

The final thickness of the fibers F on the die plate 18 is determined by a number of factors, among which are the speed of rotation of the drum 12, the degree of vacuum in chamber 23 and the arc of submergence of the die plate in the stock, that is, the distance measured in degrees of the path of travel of the molds in which the die plates of the molds are submerged in the stock. For example, in the embodiment illustrated in FIGURE 1, it may be assumed that the die plates 18 of the various molds 11a–11f are completely submerged in the stock when the molds reach a position about 5° before "bottom dead center," or the lowermost point in the path of travel, and completely emerge from the stock after they have moved to about 5° beyond bottom dead center, with a resulting "arc of submergence" of about 10°. Of course if the pan 14 or the level L of the stock therein was raised vertically upwardly with respect to the drum 12, the arc of submergence would increase, and likewise a lowering of the pan 14 would effectively reduce the arc of submergence.

Some of the disadvantages inherent in the utilization of a mold of the type illustrated in FIGURES 2 and 3 are as follows. First of all, the vacuum pump 25 must have a relatively high c.f.m. capacity in order to maintain a relatively high vacuum condition (for example, about 15″ Hg) in the conduit 24 even though some of the die plates may be free of a molded article or the article thereon may be loosely compacted or partially or completely dried, with the result that the combined pressure drop of the die plate and the article is relatively low.

Another disadvantage resides in the fact that upon complete submergence of the die plate 18 in the stock S, the vacuum in chamber 23 attains a level equal to the vacuum in conduit 24, or within the drum 12. It is usually desirable in order to form the molded articles on the die plates as quickly as possible and therefore to afford high production rates, to maintain the vacuum within the drum 12 at a level sufficient to evacuate the chamber 23 in a very brief period of time. However, since the vacuum chamber 23 will shortly equal the high vacuum in conduit 24, upon emergence of the die plate and molded article thereon from the stock S, ambient air may be drawn through the molded article, thereby producing pin holes or other defects in the article and reducing the quality thereof.

Figure 5:
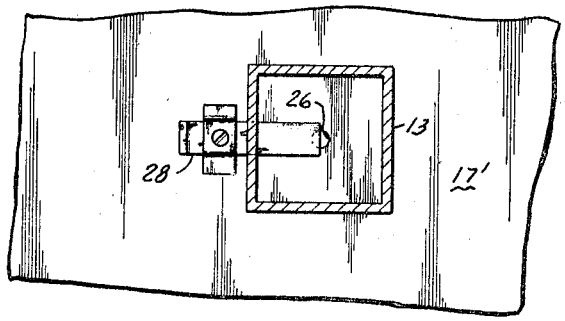
FIGURE 5 is a horizontal sectional view of the improved mold member taken substantially along lines V—V of FIGURE 4.

Referring now to FIGURES 4 and 5, wherein parts similar to those shown in FIGURES 1–3 are given similar reference characters with the suffix (′) added, an improved mold constructed in accordance with the principles of the present invention is indicated at 11′. It will be noted that the top wall 17′ of the mold extends completely across the inner diameter D of the tubular support member 13 and has a small orifice 26 formed therein for communicating the chamber 23′ with the inside of the support member 13.

The orifice 26 provides a restriction or impediment to flow of air from the chamber 23′ to the inside of the support member 13, the pressure drop across orifice 26 depending, of course, upon the size of the orifice, the rate of flow therethrough, etc.

As a result of the solid top wall 17′ and the orifice 26 formed therein, before the pervious die plate 18′ is even partially submerged in the stock and while the resistance to air flow through the die plate is relatively low, a high vacuum condition can nevertheless be maintained in the tubular support member 13 by the vacuum pump 25 without the requirement of a high c.f.m. capacity of the pump. Thus, the size, expense, cost of operation, etc., of the pump 25 can be substantially reduced.

As soon as the die plate 18′ has been completely submerged in the stock, however, the pressure in the chamber 23′, which until then may be quite close to atmospheric, will drop rapidly as a result of the sharp reduction of air flow through the orifice 26 and a concomitant reduction in pressure drop thereacross. A vacuum condition will thereupon obtain in the chamber 23′ to draw the water in the stock through the die plate 18′ and to collect the fibers on the outer face 19′ of the die plate.

In order to provide a more rapid reduction in pressure within the chamber 23′ upon complete submergence of the die plate 18′, the pressure in the drum 12 or conduit 24 may be maintained at a pressure which is lower than the pressure desired in the chamber upon complete submergence of the die plate 18′, since upon emergence of the die plate from the stock air may be drawn through the molded article to form pin holes or other imperfections, thereby reducing the quality of the molded article. Such pressure differential is accomplished in accordance with the principles of the present invention through the provision of a second orifice 27, which may be designated a "bleed hole." The orifice 27 has the effect of providing a "bleed" for a small amount of ambient air to enter the chamber 23′ and to maintain the pressure within the chamber above the pressure within the drum 12. As a result not only is the pressure in the chamber 23′ rapidly reduced upon complete submergence of the die plate 18′ because of the extra low pressure in the drum 12, but the molded article is not subject to pin holes and similar defects upon emergence of the die plate and the article thereon from the stock.

Figure 6:
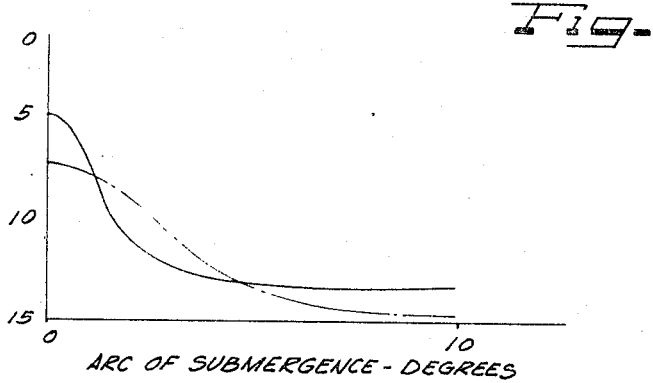
FIGURE 6 is a diagram illustrative of the variations in pressure in the vacuum chambers of a conventional mold member as shown in FIGURES 2 and 3, and an improved mold member incorporating the principles of the present invention as shown in FIGURE 4.

The difference in operating characteristics between the mold 11 as shown in FIGURES 2 and 3 and the mold 11′ as shown in FIGURE 4 is illustrated in the diagram of FIGURE 6 wherein the scale on the axis of abscissas represents the arc of submergence of a die plate (from 0 to 10°) and the scale on the axis of ordinates represents pressure in the chamber of the mold (from atmospheric to 15″ Hg). It will be assumed that the pressure in the drum 12 is about 15″ Hg, and the broken line curve represents pressure in the chamber 23 of the mold 11, and the solid line curve represents pressure in the chamber 23' in the mold 11'.

With respect to the mold 11, it will be appreciated that immediately after complete submergence of the die plate 18 the pressure in the chamber 23 will be just about equal to the pressure within the chamber prior to submergence, or about 7½″ Hg in the exemplary embodiment. As the mold 11 moves through the arc of submergence, the pressure within chamber 23 is gradually reduced until it approaches or equals the pressure which exists in the drum 12 or conduit 24, 15″ Hg.

On the other hand, the pressure in chamber 23' of mold 11' before and immediately after complete submergence is about 5″ Hg. However, since the pressure within the tubular member 13 always remains close to the pressure within the drum 12 and required little evacuation, the pressure within chamber 23' drops more rapidly than the pressure within chamber 23 of the mold 11. Whereas the pressure within chamber 23 continues to fall, however, until it substantially equals the pressure within the drum 12, the pressure within the chamber 23' does not drop below about 12½″ Hg as a result of the bleed hole 27 formed in the sidewall 16' of the mold 11'.

It is generally more desirable if the size of the bleed hole 27 is smaller than the size of the orifice 26 and in order to vary the size of the orifices a pair of slidable valve members 28 and 29 are mounted respectively on the top wall 17' and the sidewall 16'. Thus, with changes in stock, vacuum, speed of rotation of the drum 12, the level L of the stock, etc., the sizing of the orifices 26 and 27 can be changed accordingly for optimum results.

It will be appreciated that the two orifices perform substantially independent functions, the purpose of orifice 26 being to permit a substantial reduction in the CFM requirements of the vacuum pump 25, and the purpose of orifice 27 being to allow the pressure in drum 12 to be maintained at a pressure substantially less than the lowest desirable pressure in chamber 23', while maintaining the pressure in chamber 23' above the pressure in the drum upon complete submergence of the die plate 18' in the stock.

Although minor modifications might be suggested by those versed in the art, it should be understood that I wish to embody within the scope of the patent warranted hereon all such modifications as reasonably come within the scope of my contribution to the art.

I claim as my invention:

1. In a pulp molding machine including a mold having an open end and a die plate extending across the open end for forming a vacuum chamber within the mold, a pan of stock, means for submerging a portion of the mold including the die plate in the stock and then withdrawing the same therefrom, vacuum pump means for providing a vacuum condition at a substantially constant level and conduit means for connecting the vacuum pump means to the vacuum chamber, the improvement of means for controlling the level of vacuum in the vacuum chamber comprising means providing a first orifice for communicating said conduit means and said vacuum chamber which restricts the flow of air therebetween and for maintaining a pressure within said conduit means, before submergence of said die plate in the stock, substantially below the pressure which obtains in said vacuum chamber, means providing a second orifice for communicating said vacuum chamber and the atmospheric air surrounding said mold for maintaining in said vacuum chamber, during submergence of said die plate in the stock, at a pressure which is lower than atmospheric but higher than the pressure which obtains in said conduit means, said orifice positioned to remain disposed above the level of stock when the die plate is submerged therein, said orifices being fixed in size both before and during submergence of said die plate in said mold and said second orifice being sufficiently small to enable water to be drawn substantially uniformly through the die plate and to enable the stock fibers to be deposited substantially uniformly across said die plate and without pin holes, wire marks and similar defects in the article formed thereon.

2. The invention as defined in claim 1 wherein said first orifice is greater in size than is said second orifice.

3. The invention as defined in claim 1 and including means for adjustably individually varying the size of each of said orifices.

4. A vacuum mold for use in a molding operation, in combination with a source of vacuum maintained at a substantially constant level, wherein an article forming surface on the mold is submerged into a pan of stock for forming a molded article thereon, comprising a mold body having means forming a closed vacuum chamber therein which is open at one end a pervious die plate having an article forming surface thereon mounted on said mold body and extending across said open end for submergence in said stock pan, conduit means connected at one end to said mold body and communicating with said vacuum chamber to provide an air flow path from said vacuum chamber to said vacuum source, means forming a first orifice in said flow path in proximately spaced relation to said vacuum chamber causing a pressure drop thereacross and for maintaining a pressure in said vacuum chamber which is greater than the pressure in said conduit means between said first orifice and said vacuum chamber prior to submergence, and means forming a second orifice in said mold body in spaced relation to said open end and to said die plate to remain disposed above the level of stock when the die plate is submerged therein and communicating said vacuum chamber with atmospheric air surrounding said mold for maintaining the pressure in said vacuum chamber above the pressure in said conduit means between said first orifice and said vacuum source upon complete submergence of said die plate in the stock.

5. The vacuum mold as defined in claim 4 wherein the size of said second orifice is greater than the size of said first orifice.

6. The vacuum mold as defined in claim 4 and including means for adjustably individually varying the size of each of said orifices.

References Cited

UNITED STATES PATENTS

| | | | |
|---|---|---|---|
| 1,527,202 | 2/1925 | Louisot | 162—387 |
| 2,559,945 | 7/1951 | Chaplin | 162—391 |

S. LEON BASHORE, *Primary Examiner.*

JOHN H. HARMAN, *Assistant Examiner.*

U.S. Cl. X.R.

162—391; 249—141; 264—86